US011064380B2

(12) United States Patent
Jiang et al.

(10) Patent No.: US 11,064,380 B2
(45) Date of Patent: Jul. 13, 2021

(54) METHOD AND DEVICE IN UE AND BASE STATION FOR WIRELESS COMMUNICATION

(71) Applicants: Qi Jiang, Shanghai (CN); XiaoBo Zhang, Shanghai (CN); Lin Yang, Shanghai (CN)

(72) Inventors: Qi Jiang, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 109 days.

(21) Appl. No.: 16/662,037

(22) Filed: Oct. 24, 2019

(65) Prior Publication Data

US 2020/0137606 A1     Apr. 30, 2020

(30) Foreign Application Priority Data

Oct. 24, 2018   (CN) .......................... 201811242130.0

(51) Int. Cl.
*H04W 24/10*    (2009.01)
*H04W 72/04*    (2009.01)

(52) U.S. Cl.
CPC ......... *H04W 24/10* (2013.01); *H04W 72/042* (2013.01)

(58) Field of Classification Search
CPC . H04W 24/10; H04W 72/042; H04W 72/044; H04W 72/085; H04L 5/0057;

(Continued)

(56) References Cited

U.S. PATENT DOCUMENTS

2016/0020879 A1*  1/2016  Shimezawa ........... H04W 72/04
                                                               370/329
2018/0132122 A1   5/2018  Yoo et al.
2018/0212663 A1*  7/2018  Liu ...................... H04B 7/0626

FOREIGN PATENT DOCUMENTS

CN       106549745 A      3/2017
CN       106888062 A      6/2017
                (Continued)

OTHER PUBLICATIONS

Search Report of the CN Patent No. 201811242130.0 dated Aug. 28, 2020.

(Continued)

*Primary Examiner* — Marisol Figueroa

(57) ABSTRACT

The disclosure provides a method and a device in a User Equipment (UE) and a base station for wireless communication. The UE receives a first reference signal in a first time-frequency resource set, and transmits first information and second information; the first information indicates the first time-frequency resource set from Q candidate time-frequency resource sets; at least two of the Q candidate time-frequency resource sets correspond to a first type and a second type respectively; a channel measurement for the first reference signal is used for determining the second information; and a type of channel state information included in the second information is related to a type corresponding to the first time-frequency resource set. A relationship is established between the type corresponding to the first time-frequency resource set and the content of the second information, thus improving the feedback precision and efficiency of channel state information.

20 Claims, 13 Drawing Sheets

(58) Field of Classification Search
CPC ... H04L 5/0053; H04L 5/0094; H04L 5/0048; H04B 17/309; H04B 17/382; H04B 7/0456; H04B 7/0632
See application file for complete search history.

(56) References Cited

FOREIGN PATENT DOCUMENTS

| | | |
|---|---|---|
| CN | 107294578 A | 10/2017 |
| CN | 107733549 A | 2/2018 |
| CN | 107733609 A | 2/2018 |
| CN | 107889133 A | 4/2018 |
| CN | 108111254 A | 6/2018 |
| CN | 108289311 A | 7/2018 |
| CN | 108292942 A | 7/2018 |
| CN | 108322414 A | 7/2018 |
| WO | 2017150942 A1 | 9/2017 |
| WO | 2018112322 A2 | 6/2018 |

OTHER PUBLICATIONS

1st Office Action of the CN Patent No. 201811242130.0 dated Sep. 2, 2020.
«3GPP TSG RAN meeting#75:RP-170002» ETSI MCC Draft Report of 3GPP TSG RAN meeting #74.
Page 8-14 of the documents received from «3GPP TSG-RAN WG2#96:R2-168015» dated Nov. 18, 2016.
Second Office Action received from the Chinese Patent No. 201811242130.0 dated Nov. 10, 2020.
Second Search Report received from the Chinese Patent No. 201811242130.0 dated Sep. 30, 2020.

\* cited by examiner

| First Field | First Information | Second Information |
|---|---|---|

FIG.9

| CQI |
|---|
| PMI |
| RI |
| RSRP |
| RSRQ |
| PTI |
| SINR |

Second Information

FIG.10

| CQI index | Modulation | Code rate * 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

FIG.11

| CQI index | Modulation | Code rate * 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

FIG.12

METHOD AND DEVICE IN UE AND BASE STATION FOR WIRELESS COMMUNICATION

CROSS-REFERENCE TO RELATED APPLICATION

This application claims the priority benefit of Chinese Patent Application Serial Number 201811242130.0, filed on Oct. 24, 2018, the full disclosure of which is incorporated herein by reference.

BACKGROUND

Technical Field

The disclosure relates to transmission methods and devices in wireless communication systems, and in particular to a method and a device for transmission of uplink control information.

Related Art

In 5G systems, Enhance Mobile Broadband (eMBB) and Ultra Reliable and Low Latency Communication (URLLC) are two typical types of services. In the 3rd Generation Partner Project (3GPP) New Radio (NR) Release 15, a new Modulation and Coding Scheme (MCS) table has been defined for requirements of lower target BLER ($10^{-5}$) of URLLC services.

In order to support URLLC services of higher requirements, for example, higher reliability (for example, target BLER is $10^{-6}$)), lower latency (for example, 0.5-1 ms), etc., a Study Item (SI) of URLLC enhancement of NR Release 16 was approved at the 3GPP Radio Access Network (RAN) #80 plenary session. Particularly, enhancement of Uplink Control Information (UCI) feedback is a key point to be studied.

SUMMARY

In 5G systems, there are a variety of reference signals used for different purposes in downlink, for example, a Channel State Information Reference Signal (CSI-RS) is mainly used by a User Equipment (UE) to feed back and report channel state information, a Demodulation Reference Signal (DMRS) is mainly used for demodulation of data or control channel, and a Phase-tracking Reference Signal (PTRS) is mainly used for tracking and adjusting phase. Meanwhile, a base station would configure a UE to transmit different types of channel state information as a reference for subsequent scheduling.

The inventor finds through researches that, besides CSI-RS, other downlink Reference Signals (RSs) can also serve as references for uplink feedback.

In view of the above problems, the disclosure provides a solution. It should be noted that the embodiments of the disclosure and the characteristics in the embodiments may be mutually combined arbitrarily if no conflict is incurred.

The disclosure provides a method in a UE for wireless communication, wherein the method includes:
receiving a first reference signal in a first time-frequency resource set; and
transmitting first information and second information.
Herein, the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information included in the second information is related to a type corresponding to the first time-frequency resource set, and the type corresponding to the first time-frequency resource set is one of the first type and the second type; and any one type of channel state information included in the second information belongs to a first channel state information type set.

In one embodiment, the above method has the following benefits: the UE determines the type of the channel state information to be transmitted actually according to the actual channel detection result; when a spatial reception parameter employed by the UE, that is, a beamforming vector used for reception, is stable, the UE only needs to feed back a Channel Quality Indicator (CQI); when a spatial reception parameter employed by the UE generates a big fluctuation in performance, the UE needs to feed back a CQI and a Precoding Matrix Indicator (PMI) simultaneously, to help a base station to adjust a subsequent scheduling scheme; the above method adaptively adjusts the number of information bits in Uplink Control Information (UCI), thereby optimizing the spectrum efficiency of transmission of the UCI.

In one embodiment, the above method has another following benefit: a relationship is established between the type of the channel state information included in the second information and the type corresponding to the first time-frequency resource set, that is, a relationship is established between the content of the CQI fed back and the type of the RS to which the feedback refers, so that RSs other than the CSI-RS can be fully utilized to acquire and feed back a CSI, the density of configuration of CSI-RS is reduced and the spectrum efficiency is improved.

In one embodiment, the above method has yet another following benefit: the first information indicates explicitly the type corresponding to the first time-frequency resource set, thus indicating explicitly the type of the channel state information included in the second information, and improving the correctness of reception at the base station side.

According to one aspect of the disclosure, the above method includes:
receiving a first signaling.
Herein, the first signaling includes Q pieces of configuration information, and the Q candidate time-frequency resource sets are assigned to Q reference signal resources by the Q pieces of configuration information respectively.

According to one aspect of the disclosure, the above method is characterized in that: if the type corresponding to the first time-frequency resource set is the first type, the second information includes a target type of channel state information; and if the type corresponding to the first time-frequency resource set is the second type, the second information does not include a target type of channel state information.

According to one aspect of the disclosure, the above method includes:
receiving a first radio signal.
Herein, the second information includes a first field, and the first field is used for determining whether the first radio signal is correctly received.

According to one aspect of the disclosure, the above method is characterized in that: the second information includes a given type of channel state information; the first radio signal is correctly received and the given type of channel state information includes M1 information bit(s), or the first radio signal is not correctly received and the given type of channel state information includes M2 information bit(s); the M1 and the M2 are both positive integers; the M1 is not equal to the M2, or the M1 information bit(s) and the M2 information bit(s) are associated with different CQI sets respectively.

In one embodiment, the above method has the following benefits: an area of CQI Index set corresponding to the CQI feedback is determined according to a reception quality of the first radio signal, further reducing the number of bits actually employed to transmit the CQI Index and improving uplink spectrum efficiency.

According to one aspect of the disclosure, the above method includes:

receiving a second signaling.

Herein, the second signaling is used for triggering transmission of at least the second information among the first information and the second information.

The disclosure provides a method in a base station for wireless communication, wherein the method includes:

transmitting a first reference signal in a first time-frequency resource set; and receiving first information and second information.

Herein, the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information included in the second information is related to a type corresponding to the first time-frequency resource set, and the type corresponding to the first time-frequency resource set is one of the first type and the second type; and any one type of channel state information included in the second information belongs to a first channel state information type set.

According to one aspect of the disclosure, the above method includes:

transmitting a first signaling.

Herein, the first signaling includes Q pieces of configuration information, and the Q candidate time-frequency resource sets are assigned to Q reference signal resources by the Q pieces of configuration information respectively.

According to one aspect of the disclosure, the above method is characterized in that: if the type corresponding to the first time-frequency resource set is the first type, the second information includes a target type of channel state information; and if the type corresponding to the first time-frequency resource set is the second type, the second information does not include a target type of channel state information.

According to one aspect of the disclosure, the above method includes:

transmitting a first radio signal.

Herein, the second information includes a first field, and the first field is used for determining whether the first radio signal is correctly received.

According to one aspect of the disclosure, the above method is characterized in that: the second information includes a given type of channel state information; the first radio signal is correctly received by a transmitter of the first information and the given type of channel state information includes M1 information bit(s), or the first radio signal is not correctly received by a transmitter of the first information and the given type of channel state information includes M2 information bit(s); the M1 and the M2 are both positive integers; the M1 is not equal to the M2, or the M1 information bit(s) and the M2 information bit(s) are associated with different CQI sets respectively.

According to one aspect of the disclosure, the above method includes:

transmitting a second signaling.

Herein, the second signaling is used for triggering transmission of at least the second information among the first information and the second information.

The disclosure provides a UE for wireless communication, wherein the UE includes:

a first receiver, to receive a first reference signal in a first time-frequency resource set; and a first transmitter, to transmit first information and second information.

Herein, the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information included in the second information is related to a type corresponding to the first time-frequency resource set, and the type corresponding to the first time-frequency resource set is one of the first type and the second type; and any one type of channel state information included in the second information belongs to a first channel state information type set.

The disclosure provides a base station for wireless communication, wherein the base station includes:

a second transmitter, to transmit a first reference signal in a first time-frequency resource set; and a second receiver, to receive first information and second information.

Herein, the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information included in the second information is related to a type corresponding to the first time-frequency resource set, and the type corresponding to the first time-frequency resource set is one of the first type and the second type; and any one type of channel state information included in the second information belongs to a first channel state information type set.

In one embodiment, compared with conventional schemes, the disclosure has the following advantages.

The UE determines the type of the channel state information to be transmitted actually according to the actual channel detection result; when a spatial reception parameter employed by the UE, that is, a beamforming vector used for reception, is stable, the UE only needs to feed back a CQI; when a spatial reception parameter employed by the UE generates a big fluctuation in performance, the UE needs to feed back a CQI and a PMI simultaneously, to help a base station to adjust a subsequent scheduling scheme; the above method adaptively adjusts the number of information bits in a UCI, thereby optimizing the spectrum efficiency of transmission of the UCI.

A relationship is established between the type of the channel state information included in the second information and the type corresponding to the first time-frequency resource set, that is, a relationship is established between the content of the CQI fed back and the type of the RS to which the feedback refers, so that RSs other than the CSI-RS can be fully utilized to acquire and feed back a CSI, the density of configuration of CSI-RS is reduced and the spectrum efficiency is improved.

The first information indicates explicitly the type corresponding to the first time-frequency resource set, thus indicating explicitly the type of the channel state information included in the second information, and improving the correctness of reception at the base station side.

An area of CQI Index set corresponding to the CQI feedback is determined according to a reception quality of the first radio signal, further reducing the number of bits actually employed to transmit the CQI Index and improving uplink spectrum efficiency.

BRIEF DESCRIPTION OF THE DRAWINGS

Other features, purposes and advantages of the disclosure will become more apparent from the detailed description of non-restrictive embodiments taken in conjunction with the following drawings.

FIG. 9 is a diagram illustrating a first field according to one embodiment of the disclosure.

FIG. 10 is a diagram illustrating second information according to one embodiment of the disclosure.

FIG. 11 is a diagram illustrating given channel state information according to one embodiment of the disclosure.

FIG. 12 is a diagram illustrating given channel state information according to another embodiment of the disclosure.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
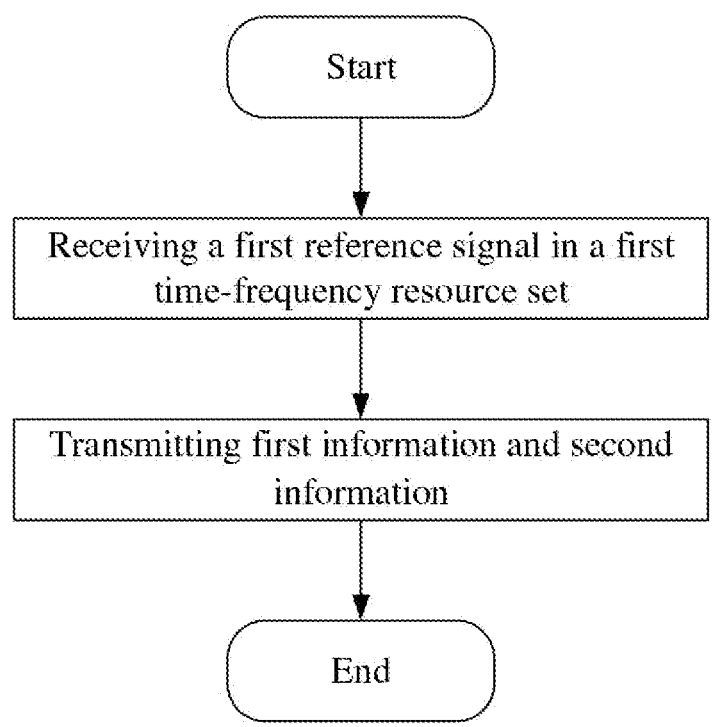
FIG. 1 is a flowchart of first information and second information according to one embodiment of the disclosure.

Embodiment 1 illustrates an example of a flowchart of first information and second information, as shown in FIG. 1.

In Embodiment, the UE in the disclosure first receives a first reference signal in a first time-frequency resource set, and then transmits first information and second information; the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information included in the second information is related to a type corresponding to the first time-frequency resource set, and the type corresponding to the first time-frequency resource set is one of the first type and the second type; and any one type of channel state information included in the second information belongs to a first channel state information type set.

In one embodiment, the phrase that a type of channel state information included in the second information is related to a type corresponding to the first time-frequency resource set includes: the number of types of channel state information included in the second information is related to the type corresponding to the first time-frequency resource set.

In one embodiment, the phrase that a type of channel state information included in the second information is related to a type corresponding to the first time-frequency resource set includes: varieties of types of channel state information included in the second information are related to the type corresponding to the first time-frequency resource set.

In one embodiment, the phrase that a type of channel state information included in the second information is related to a type corresponding to the first time-frequency resource set includes: a total number of all information bits corresponding to all types of channel state information included in the second information are related to the type corresponding to the first time-frequency resource set.

In one embodiment, any one of the Q candidate time-frequency resource sets includes multiple Resource Elements (REs).

In one embodiment, any one of the Q candidate time-frequency resource sets is assigned to RS(s) of a positive integer number of antenna ports.

In one embodiment, REs included in any one of the Q candidate time-frequency resource sets are not contiguous in frequency domain.

In one embodiment, REs included in any one of the Q candidate time-frequency resource sets are not contiguous in time domain.

In one embodiment, any one of the Q candidate time-frequency resource sets corresponds to one of the first type and the second type.

In one embodiment, a given candidate time-frequency resource set is any one of the Q candidate time-frequency resource sets; if the given candidate time-frequency resource set corresponds to the first type, the given candidate time-frequency resource set is assigned to the first type of RS; if the given candidate time-frequency resource set corresponds to the second type, the given candidate time-frequency resource set is assigned to the second type of RS.

In one embodiment, a given candidate time-frequency resource set is any one of the Q candidate time-frequency resource sets; if the given candidate time-frequency resource set corresponds to the first type, the given candidate time-frequency resource set is assigned to a wideband RS; if the given candidate time-frequency resource set corresponds to the second type, the given candidate time-frequency resource set is assigned to a subband RS.

In one subembodiment, the first type of RS is a CSI-RS.

In one subembodiment, the second type of RS is a DMRS.

In one subembodiment, the second type of RS is a PTRS.

In one subembodiment, the second type of RS is a Synchronization Signal Block (SSB).

In one embodiment, the first channel state information type set includes three channel state information types, which are a CQI, a PMI and a Rand Indicator (RI) respectively.

In one subembodiment, the PMI includes a wideband PMI.

In one subembodiment, the PMI includes a subband PMI.

In one embodiment, the channel state information type included in the first channel state information type set includes a Precoder Type Indication (PTI).

In one embodiment, the channel state information type included in the first channel state information type set includes a Referene Signal Received Power (RSRP).

In one subembodiment, the RSRP is specific to Layer 1.

In one embodiment, the channel state information type included in the first channel state information type set includes a Reference Signal Received Quality (RSRQ).

In one subembodiment, the RSRQ is specific to Layer 1.

In one embodiment, the channel state information type included in the first channel state information type set includes a Signal-to-Interference plus Noise Ratio (SINR).

In one subembodiment, the SINR is specific to Layer 1.

In one embodiment, the first information and the second information both belong to UCIs.

In one embodiment, the first information and the second information are transmitted in one same Physical Uplink Control Channel (PUCCH).

In one embodiment, the first information and the second information are transmitted in one same Physical Uplink Shared Channel (PUSCH).

In one embodiment, the first information and the second information are transmitted in different PUCCHs.

In one embodiment, the first information and the second information are transmitted in different PUSCHs.

In one embodiment, all information bits included in one UCI format include information bits included in the first information and information bits included in the second information.

In one embodiment, the first information includes 1 information bit only.

In one embodiment, the first information includes 2 information bits.

In one embodiment, the first information includes multiple information bits.

In one embodiment, the first information includes X information bits, the X being a positive integer greater than 1.

Embodiment 2

Figure 2:
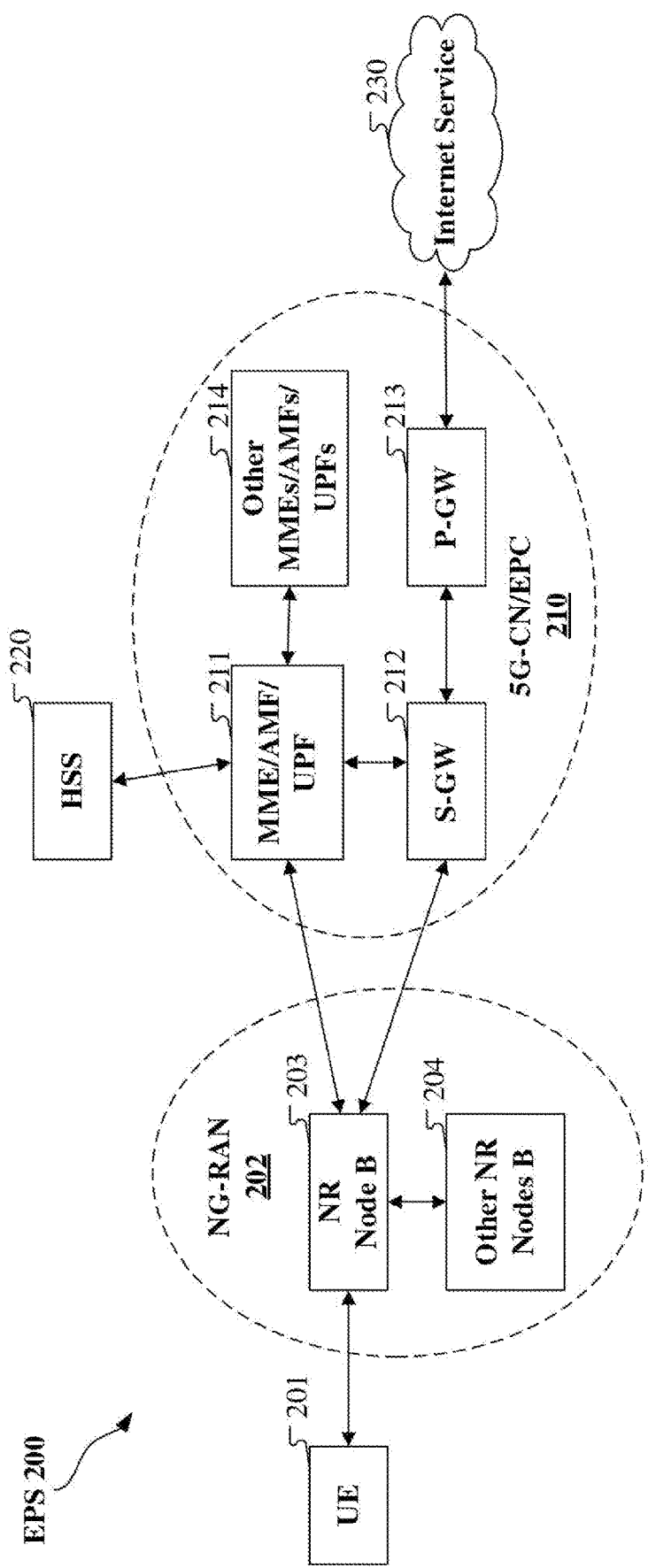
FIG. 2 is a diagram illustrating a network architecture according to one embodiment of the disclosure.

Embodiment 2 illustrates an example of a diagram of a network architecture, as shown in FIG. 2.

Embodiment 2 illustrates an example of a diagram of a network architecture according to the disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the UE in the disclosure.

In one embodiment, the gNB 203 corresponds to the base station in the disclosure.

In one embodiment, the UE 201 supports beamforming based wireless communication.

In one embodiment, the gNB 203 supports beamforming based wireless communication.

In one embodiment, the UE 201 supports simultaneous transmission of multiple PUCCHs.

In one embodiment, the gNB 203 supports simultaneous transmission of multiple PUCCHs.

Embodiment 3

Figure 3:
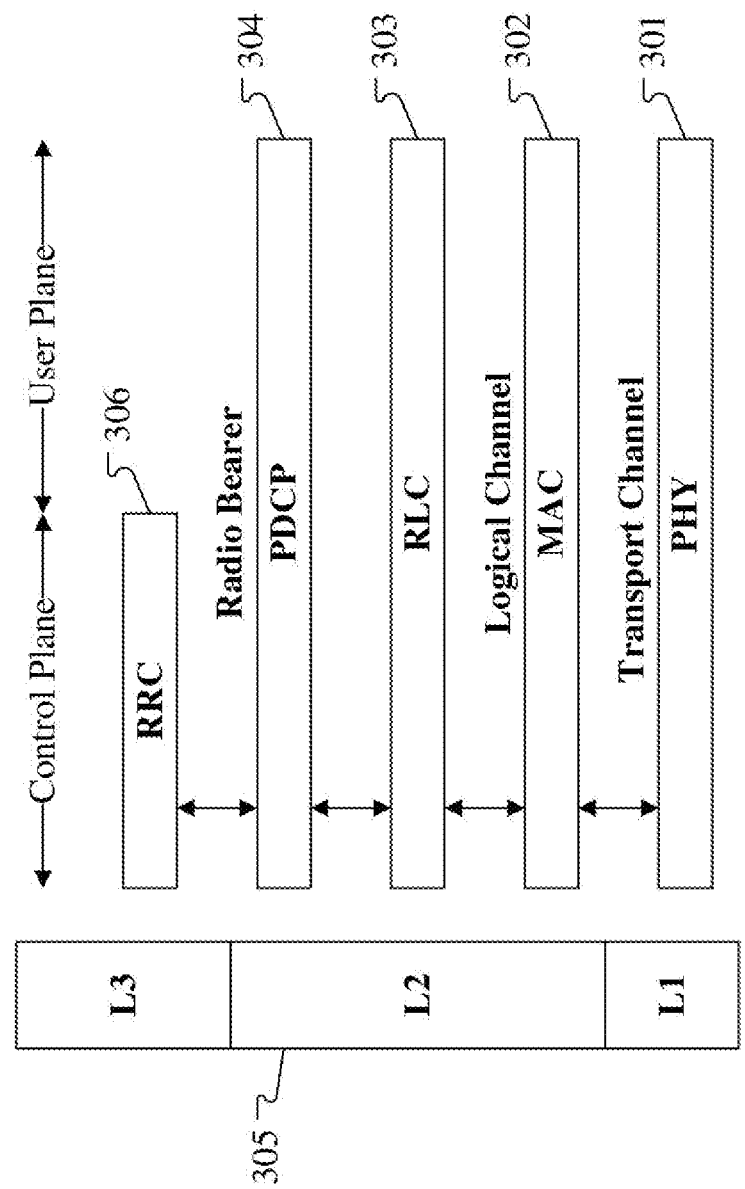
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the UE in the disclosure.

In one embodiment, the radio protocol architecture shown in FIG. 3 is applicable to the base station in the disclosure.

In one embodiment, the first reference signal in the disclosure is generated by the PHY 301.

In one embodiment, the first information in the disclosure is generated by the PHY 301.

In one embodiment, the second information in the disclosure is generated by the PHY 301.

In one embodiment, the first signaling in the disclosure is generated by the RRC sublayer 306.

In one embodiment, the first signaling in the disclosure is generated by the PHY 301.

In one embodiment, the first signaling in the disclosure is generated by the MAC sublayer 302.

In one embodiment, the first radio signal in the disclosure is generated by the MAC sublayer 302.

In one embodiment, the second signaling in the disclosure is generated by the PHY 301.

In one embodiment, the second signaling in the disclosure is generated by the MAC sublayer 302.

Embodiment 4

Figure 4:
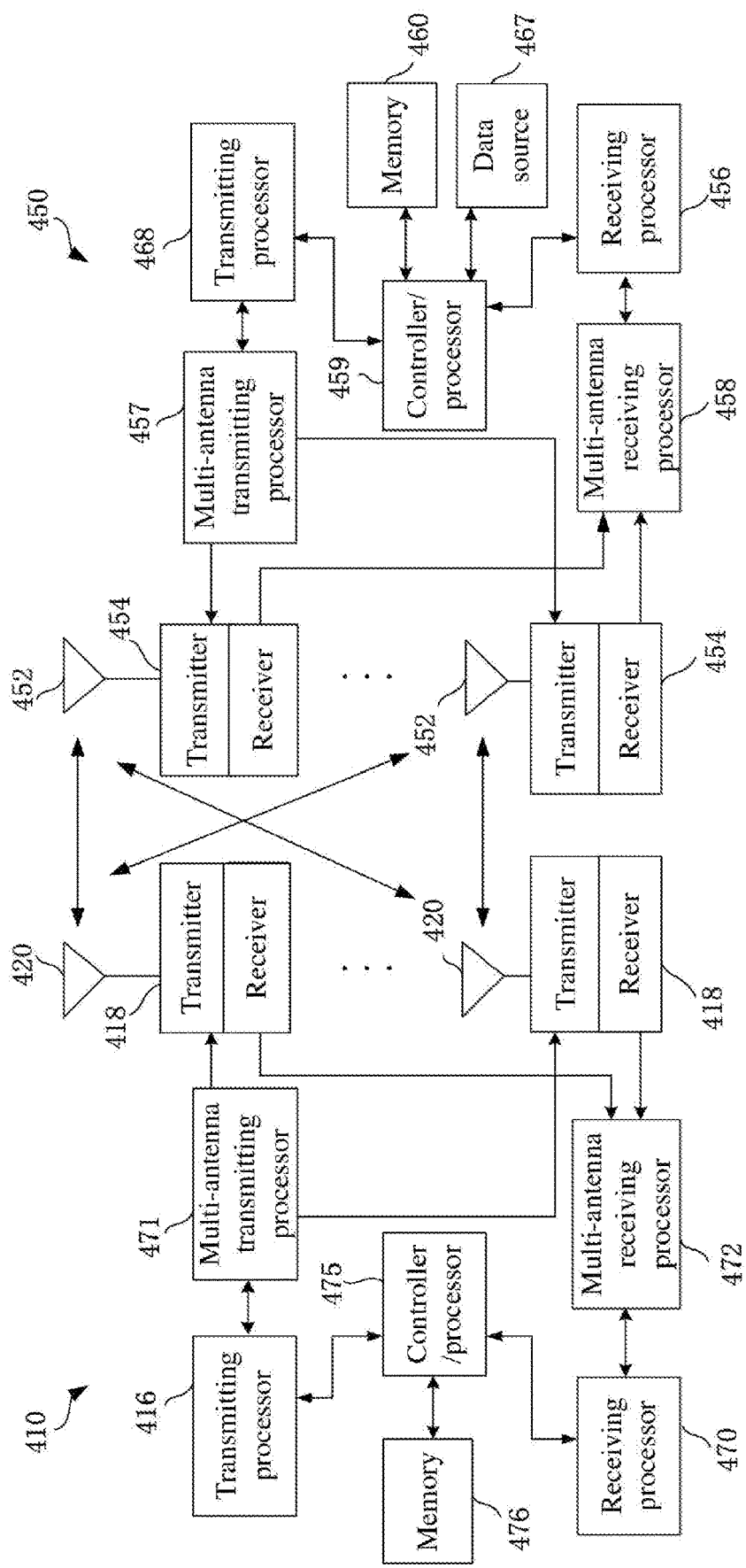
FIG. 4 is a diagram illustrating an NR node and a UE according to one embodiment of the disclosure.

Embodiment 4 illustrates a diagram of a base station and a UE according to the disclosure, as shown in FIG. 4. FIG. 4 is a block diagram of a gNB 410 in communication with a UE 450 in an access network.

The base station 410 includes a controller/processor 440, a memory 430, a receiving processor 412, a beam processor 471, a transmitting processor 415, a transmitter/receiver 416 and an antenna 420.

The UE 450 includes a controller/processor 490, a memory 480, a data source 467, a beam processor 441, a transmitting processor 455, a receiving processor 452, a transmitter/receiver 456 and an antenna 460.

In Downlink (DL) transmission, processes relevant to the base station 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit used for transmission requirements. The scheduling unit is configured to schedule air-interface resources corresponding to transmission requirements.

The beam processor 471 determines a first signaling and a second signaling.

The transmitting processor 415 receives a bit stream output from the controller/processor 440, and performs various signal transmitting processing functions used for L1 layer (that is, PHY), including encoding, interleaving, scrambling, modulation, power control/allocation, generation of physical layer control signalings (including PBCH, PDCCH, PHICH, PCFICH, reference signal), etc.

The transmitting processor 415 receives a bit stream output from the controller/processor 440, and performs various signal transmitting processing functions used for L1 layer (that is, PHY), including multi-antenna transmission, spreading, code division multiplexing, precoding, etc.

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In DL transmission, processes relevant to the UE 450 include the following.

The receiver 456 is configured to convert a radio-frequency signal received via the antenna 460 into a baseband signal and provide the baseband signal to the receiving processor 452.

The receiving processor 452 performs various signal receiving processing functions used for L1 layer (that is, PHY), including decoding, de-interleaving, descrambling, demodulation, extraction of physical layer control signalings, etc.

The receiving processor 452 performs various signal receiving processing functions used for L1 layer (that is, PHY), including multi-antenna receiving, despreading, code division multiplexing, precoding, etc.

The beam processor 441 determines a first signaling and a second signaling.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to a memory 480 that stores program codes and data. The memory 480 may be a computer readable medium.

In UL transmission, processes relevant to the base station device 410 include the following.

The receiver 416 receives a radio-frequency signal via the corresponding antenna 420, converts the received radio-frequency signal into a baseband signal and provides the baseband signal to the receiving processor 412.

The receiving processor 412 performs various signal receiving processing functions used for L1 layer (that is, PHY), including decoding, de-interleaving, descrambling, demodulation, extraction of physical layer control signalings, etc.

The receiving processor 412 performs various signal receiving processing functions used for L1 layer (that is, PHY), including multi-antenna receiving, despreading, code division multiplexing, precoding, etc.

The controller/processor 440 performs functions of L2 layer, and is connected to the memory 430 that stores program codes and data.

The controller/processor 440 provides multiplexing between a transport channel and a logical channel, packet reassembling, decryption, header decompression, and control signal processing so as to recover a higher-layer packet coming from the UE 450. The higher-layer packet from the controller/processor 440 may be provided to a core network.

The beam processor 471 determines to receive a first bit block in a first time-frequency resource group and to receive a second bit block in a second time-frequency resource group, or to receive a first bit block and a second bit block in a third time-frequency resource group.

In UL transmission, processes relevant to the UE 450 include the following.

The data source 467 provides a higher-layer packet to the controller/processor 490. The data source 467 illustrates all protocol layers above L2 layer.

The transmitter 456 transmits a radio-frequency signal through the corresponding antenna 460, converts a baseband signal into a radio-frequency signal and provides the radio-frequency signal to the corresponding antenna 460.

The transmitting processor 455 performs various signal transmitting processing functions of L1 layer (that is, PHY), including encoding, interleaving, scrambling, modulation, generation of physical layer signalings, etc.

The transmitting processor 455 performs various signal transmitting processing functions of L1 layer (that is, PHY), including multi-antenna transmitting, spreading, code division multiplexing, precoding, etc.

The controller/processor 490 performs header compression, encryption, packet segmentation and reordering, and multiplexing between a logical channel and a transport channel based on the radio resource allocation of the gNB 410, and performs functions of Layer 2 used for the user plane and the control plane.

The controller/processor 490 is also in charge of HARQ operation, retransmission of lost packets, and signalings to the eNB 410.

The beam processor 471 determines to transmit a first bit block in a first time-frequency resource group and to transmit a second bit block in a second time-frequency resource group, or to transmit a first bit block and a second bit block in a third time-frequency resource group.

In one embodiment, the UE 450 includes at least one processor and at least one memory. The at least one memory includes computer program codes. The at least one memory and the computer program codes are configured to be used in collaboration with the at least one processor. The UE 450 receives a first reference signal in a first time-frequency resource set, and transmits first information and second information; the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information included in the second information is related to a type corresponding to the first time-frequency resource set, and the type corresponding to the first time-frequency resource set is one of the first type and the second type; and any one type of channel state information included in the second information belongs to a first channel state information type set.

In one embodiment, the UE 450 includes a memory that stores a computer readable instruction program. The computer readable instruction program generates an action when executed by at least one processor. The action includes: receiving a first reference signal in a first time-frequency resource set, and transmitting first information and second information; the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information included in the second information is related to a type corresponding to the first time-frequency resource set, and the type corresponding to the first time-frequency resource set is one of the first type and the second type; and any one type of channel state information included in the second information belongs to a first channel state information type set.

In one embodiment, the gNB 410 includes at least one processor and at least one memory. The at least one memory includes computer program codes. The at least one memory and the computer program codes are configured to be used in collaboration with the at least one processor. The gNB 410 at least transmits a first reference signal in a first time-frequency resource set, and receives first information and second information; the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information included in the second information is related to a type corresponding to the first time-frequency resource set, and the type corresponding to the first time-frequency resource set is one of the first type and the second type; and any one type of channel state information included in the second information belongs to a first channel state information type set.

In one embodiment, the gNB 410 includes a memory that stores a computer readable instruction program. The computer readable instruction program generates an action when executed by at least one processor. The action includes: transmitting a first reference signal in a first time-frequency resource set, and receiving first information and second information; the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information included in the second information is related to a type corresponding to the first time-frequency resource set, and the type corresponding to the first time-frequency resource set is one of the first type and the second type; and any one type of channel state information included in the second information belongs to a first channel state information type set.

In one embodiment, the UE 450 corresponds to the UE in the disclosure.

In one embodiment, the gNB 410 corresponds to the base station in the disclosure.

In one embodiment, at least one of the antenna 452, the receiver 454, the multi-antenna receiving processor 458 and the receiving processor 456 is used for receiving a first reference signal in a first time-frequency resource set; and at least one of the antenna 420, the transmitter 418, the multi-antenna transmitting processor 471 and the transmitting processor 416 is used for transmitting a first reference signal in a first time-frequency resource set.

In one embodiment, at least one of the antenna 452, the transmitter 454, the multi-antenna transmitting processor 457 and the transmitting processor 468 is used for transmitting first information and second information; and at least one of the antenna 420, the receiver 418, the multi-antenna receiving processor 472 and the receiving processor 470 is used for receiving first information and second information.

In one embodiment, at least one of the antenna 452, the receiver 454, the multi-antenna receiving processor 458 and the receiving processor 456 is used for receiving a first signaling; and at least one of the antenna 420, the transmitter 418, the multi-antenna transmitting processor 471 and the transmitting processor 416 is used for transmitting a first signaling.

In one embodiment, at least one of the antenna 452, the receiver 454, the multi-antenna receiving processor 458 and the receiving processor 456 is used for receiving a first radio signal; and at least one of the antenna 420, the transmitter 418, the multi-antenna transmitting processor 471 and the transmitting processor 416 is used for transmitting a first radio signal.

In one embodiment, at least one of the antenna 452, the receiver 454, the multi-antenna receiving processor 458 and the receiving processor 456 is used for receiving a second signaling; and at least one of the antenna 420, the transmitter 418, the multi-antenna transmitting processor 471 and the transmitting processor 416 is used for transmitting a second signaling.

Embodiment 5

Figure 5:
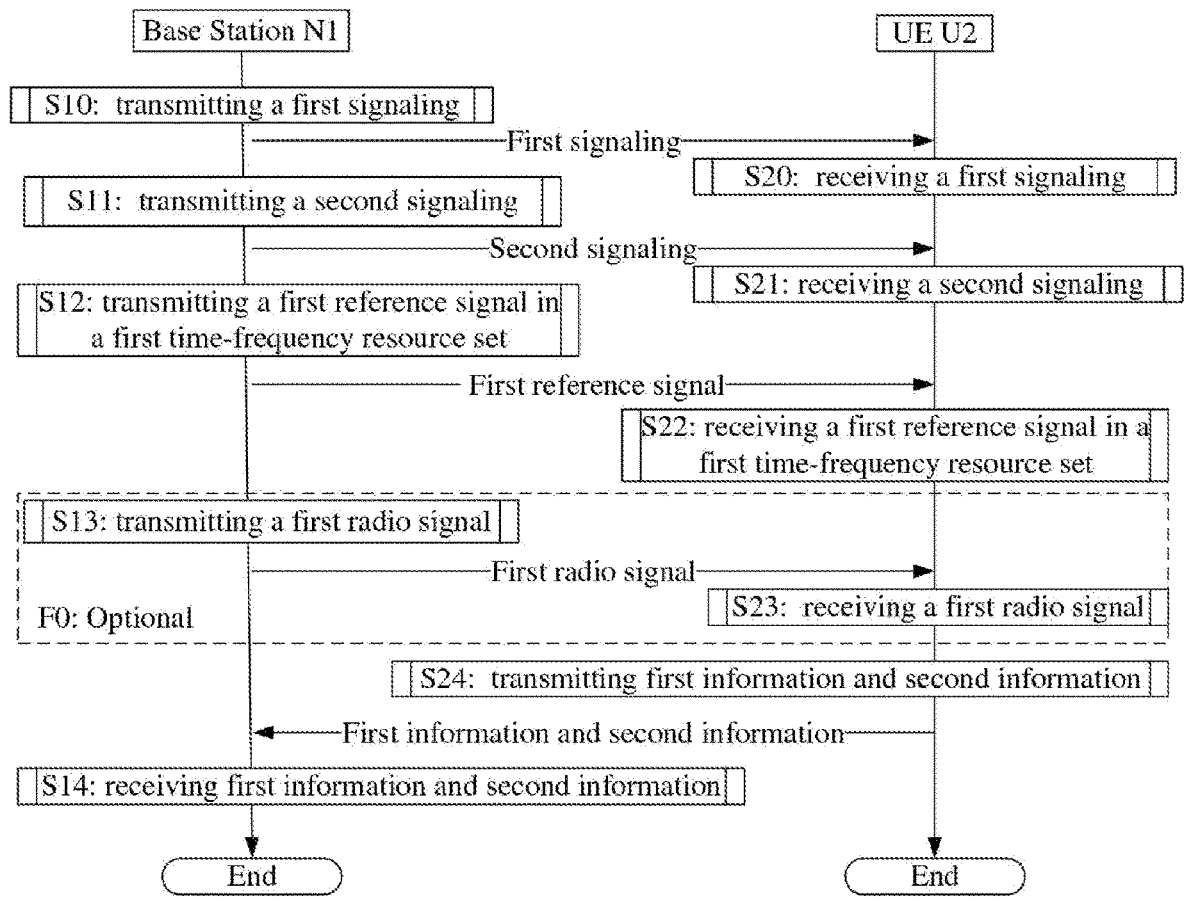
FIG. 5 is a flowchart of wireless transmission according to one embodiment of the disclosure.

Embodiment 5 illustrates an example of a flowchart of wireless transmission, as shown in FIG. 5. In FIG. 5, a base station N1 is a maintenance base station for a serving cell of a UE U2. In FIG. 5, steps in box F0 are optional.

The base station N1 transmits a first signaling in S10, transmits a second signaling in S11, transmits a first reference signal in a first time-frequency resource set in S12, transmits a first radio signal in S13, and receives first information and second information in S14.

The UE U2 receives a first signaling in S20, receives a second signaling in S21, receives a first reference signal in a first time-frequency resource set in S22, receives a first radio signal in S23, and transmits first information and second information in S24.

In Embodiment 5, the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information included in the second information is related to a type corresponding to the first time-frequency resource set, and the type corresponding to the first time-frequency resource set is one of the first type and the second type; any one type of channel state information included in the second information belongs to a first channel state information type set; the first signaling includes Q pieces of configuration information, and the Q candidate time-frequency resource sets are assigned to Q reference signal resources by the Q pieces of configuration information respectively; the second information includes a first field, and the first field is used for determining whether the first radio signal is correctly received; the second signaling is used for triggering transmission of at least the second information among the first information and the second information.

In one embodiment, any one of the Q reference signal resources includes Q1 RE sets, and the Q1 RE sets are assigned to Q1 antenna ports respectively.

In one subembodiment, the Q1 is a positive integer.

In one subembodiment, at least two of the Q reference signal resources include different numbers of RE sets.

In one embodiment, the Q reference signal resources include at least one reference signal resource which is assigned to a CSI-RS, and the Q reference signal resources include at least another one reference signal resource which is assigned to a DMRS.

In one embodiment, the Q reference signal resources include a positive integer number of reference signal resources, and the positive integer number of reference signal resources correspond to a positive integer number of CSI-RS Resource Indicators (CRIs) respectively.

In one embodiment, the Q reference signal resources include a positive integer number of reference signal resources, and the positive integer number of reference signal resources correspond to a positive integer number of DMRS configurations respectively.

In one embodiment, the first signaling includes a higher layer signaling.

In one embodiment, the first signaling includes a Radio Resource Control (RRC) layer signaling.

In one embodiment, the first signaling includes a Medium Access Control (MAC) layer signaling.

In one embodiment, if the type corresponding to the first time-frequency resource set is the first type, the second information includes a target type of channel state information; and if the type corresponding to the first time-frequency resource set is the second type, the second information does not include a target type of channel state information.

In one subembodiment, the target type of channel state information is an RI.

In one subembodiment, the target type of channel state information is a PMI.

In one subembodiment, the target type of channel state information is one of an RSRP, an RSRQ, a PTI and an SINR.

In one subembodiment, the first type of RS is a CSI-RS, and the second type of RS is a DMRS.

In one subembodiment, the type corresponding to the first time-frequency resource set is the first type, the target type of channel state information is one of a PMI and an RI, and the second information includes the target type of channel state information and a CQI; the type corresponding to the first time-frequency resource set is the second type, and the second information includes a CQI only.

In one subembodiment, the first information includes a given bit; the given bit is equal to "1" and the type corresponding to the first time-frequency resource set is the first type; and the given bit is equal to "0" and the type corresponding to the first time-frequency resource set is the second type.

In one subembodiment, the first information includes a given bit; the given bit is equal to "0" and the type corresponding to the first time-frequency resource set is the first type; and the given bit is equal to "1" and the type corresponding to the first time-frequency resource set is the second type.

In one subembodiment, the number of information bits included in the second information is related to the type corresponding to the first time-frequency resource set.

In one affiliated embodiment of the above subembodiment, the number of information bits included in the second information is equal to L1 and the type corresponding to the first time-frequency resource set is the first type; and the number of information bits included in the second information is equal to L2 and the type corresponding to the first time-frequency resource set is the second type; the L1 and the L2 are both positive integers, and the L1 is not equal to the L2.

In an example of the above affiliated embodiment, the L1 is greater than the L2.

In an example of the above affiliated embodiment, the type corresponding to the first time-frequency resource set is the first type and the second information corresponds to a first UCI format, and the type corresponding to the first time-frequency resource set is the second type and the second information corresponds to a second UCI format.

In one embodiment, a physical layer channel occupied by the first radio signal includes a Physical Downlink Shared Channel (PDSCH).

In one embodiment, a transmission layer channel occupied by the first radio signal includes a Downlink Shared Channel (DL-SCH).

In one embodiment, the first field includes a Hybrid Automatic Repeat request-Acknowledgement (HARQ-ACK) for the first radio signal.

In one embodiment, the second information includes a given type of channel state information; the first radio signal is correctly received and the given type of channel state information includes M1 information bit(s), or the first radio signal is not correctly received and the given type of channel state information includes M2 information bit(s); the M1 and the M2 are both positive integers; the M1 is not equal to the M2, or the M1 information bit(s) and the M2 information bit(s) are associated with different CQI sets respectively.

In one subembodiment, the M1 is not equal to the M2.

In one subembodiment, the M1 information bit(s) and the M2 information bit(s) are associated with different CQI sets respectively.

In one subembodiment, the given type of channel state information is a CQI.

In one subembodiment, the phrase that the M1 information bit(s) and the M2 information bit(s) are associated with different CQI sets respectively includes: the M1 information bit(s) is(are) associated with a first CQI Index set, the first CQI Index set includes M3 CQI Indexes, and the M1 information bit(s) is(are) used for indicating one CQI Index from the M3 CQI Indexes; the M2 information bit(s) is(are) associated with a second CQI Index set, the second CQI Index set includes M4 CQI Indexes, and the M2 information bit(s) is(are) used for indicating one CQI Index from the M4 CQI Indexes; the M3 and the M4 are both positive integers greater than 1, and at least one of the M4 CQI Indexes is not equal to any one of the M3 CQI Indexes.

In one affiliated embodiment of the above subembodiment, any one of the M3 CQI Indexes is one CQI in Table 5.2.2.1-2, Table 5.2.2.1-3 and Table 5.2.2.1-4 in TS 38.214.

In one affiliated embodiment of the above subembodiment, any one of the M4 CQI Indexes is one CQI in Table 5.2.2.1-2, Table 5.2.2.1-3 and Table 5.2.2.1-4 in TS 38.214.

In one affiliated embodiment of the above subembodiment, any one of the M3 CQI Indexes is associated to one modulation mode and one code rate.

In one affiliated embodiment of the above subembodiment, any one of the M4 CQI Indexes is associated to one modulation mode and one code rate.

In one embodiment, the second signaling is used for indicating frequency-domain resources occupied by the second information.

In one embodiment, the second signaling is used for indicating time-domain resources occupied by the second information.

In one embodiment, the second signaling is Downlink Control Information (DCI).

In one embodiment, the second signaling is a UL grant.

Embodiment 6

Figure 6:
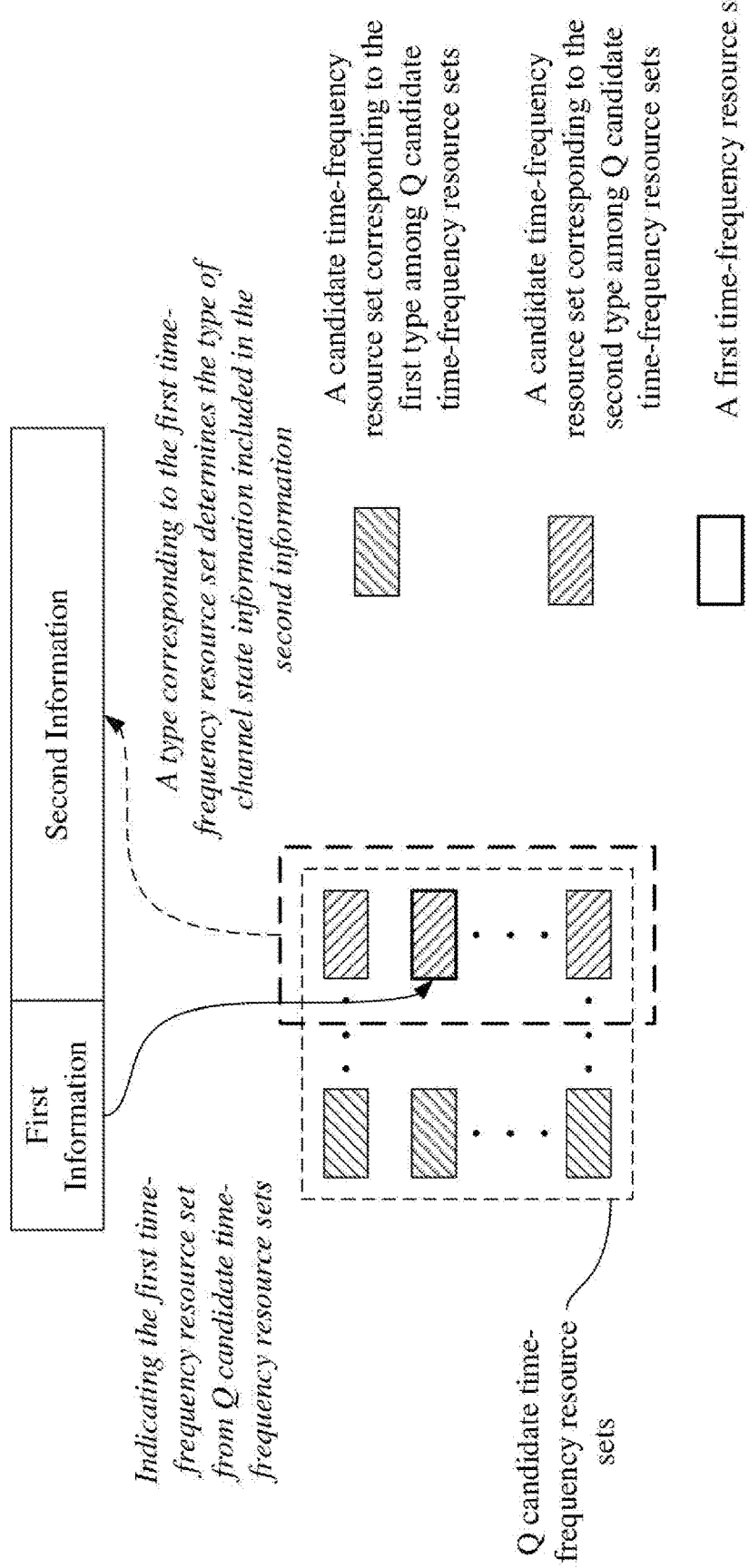
FIG. 6 is a diagram illustrating first information and second information according to one embodiment of the disclosure.

Embodiment 6 illustrates an example of a diagram of first information and second information, as shown in FIG. 6. In Embodiment 6, the first information indicates a first time-frequency resource set from Q candidate time-frequency resource sets; any one of the Q candidate time-frequency resource sets corresponds to one of a first type and a second type; channel state information included in the second information is one type of channel state information in the first channel state information type set, and the first channel state information type set includes a positive integer number of types of channel state information; a type corresponding to the first time-frequency resource set is related to the type of channel state information included in the second information.

In one embodiment, the phrase that one candidate time-frequency resource set corresponds to one of a first type and a second type refers that: REs occupied by the one candidate time-frequency resource set are used for transmission of the first type of reference signals, or REs occupied by the one candidate time-frequency resource set are used for transmission of the second type of reference signals.

In one embodiment, the first type corresponds to a CSI-RS, and the second type corresponds to reference signals other than the downlink CSI-RS.

In one affiliated embodiment of the above embodiment, the reference signals other than the downlink CSI-RS include a DMRS.

In one affiliated embodiment of the above embodiment, the reference signals other than the downlink CSI-RS include a PTRS.

In one affiliated embodiment of the above embodiment, the reference signals other than the downlink CSI-RS include an SSB.

In one embodiment, the first information includes a fixed number of information bits.

In one embodiment, the first information includes a variable number of information bits.

In one embodiment, the first channel state information type set includes at least a CQI among the CQI, a PMI, an RI, an RSRP, an RSRQ, a PTQ and an SINR.

In one embodiment, the first time-frequency resource set corresponds to a CSI-RS, the second information includes a CQI, and the second information includes at least one of a PMI, an RI, an RSRP, an RSRQ, a PTI and an SINR.

In one embodiment, the first time-frequency resource set corresponds to reference signals other than the downlink CSI-RS, the second information includes a CQI, and the second information does not include any of a PMI, an RI, an RSRP, an RSRQ, a PTI and an SINR.

Embodiment 7

Figure 7:
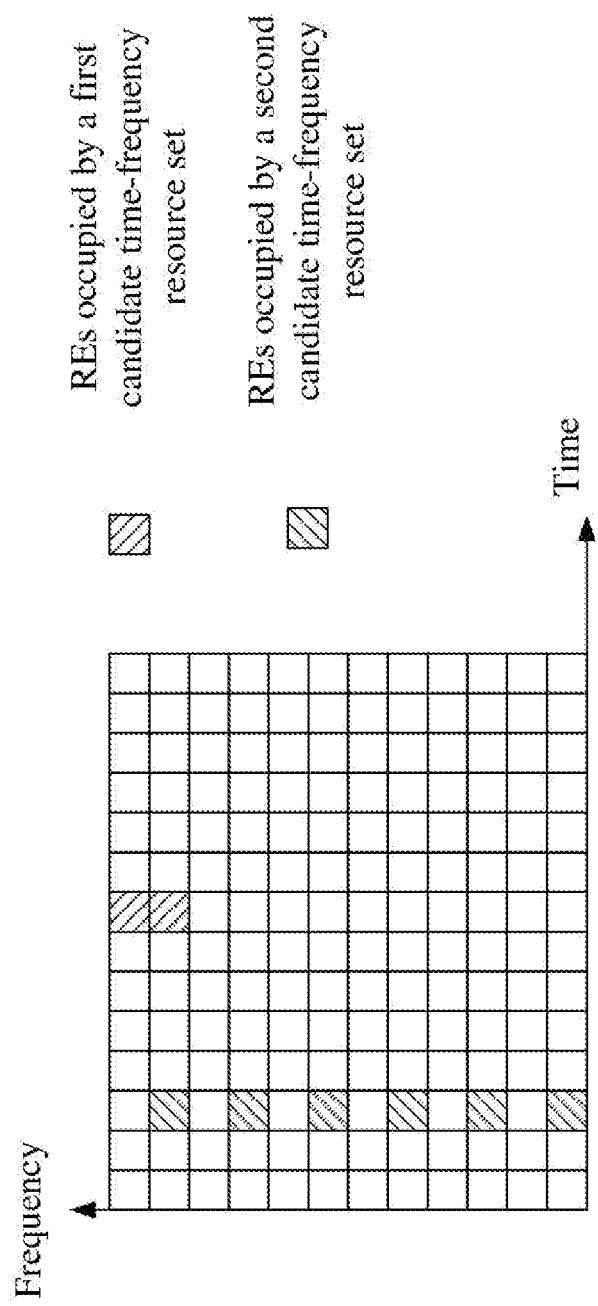
FIG. 7 is a diagram illustrating two candidate time-frequency resource sets according to one embodiment of the disclosure.

Embodiment 7 illustrates an example of a diagram of two candidate time-frequency resource sets, as shown in FIG. 7. FIG. 7 illustrates a pattern of REs occupied by two candidate time-frequency resource sets in one RB. In Embodiment 7, the two candidate time-frequency resource sets are a first candidate time-frequency resource set and a second candidate time-frequency resource set respectively, one grid represents one RE, all grids in FIG. 7 constitute one RB, the first candidate time-frequency resource set shown in FIG. 7 corresponds to the first type of RS in the disclosure, and the second candidate time-frequency resource set shown in FIG. 7 corresponds to the second type of RS in the disclosure.

In one embodiment, the first type of RS is a CSI-RS.

In one embodiment, the second type of RS is a DMRS.

In one embodiment, the first candidate time-frequency resource set is assigned to two ports of one 8-port CSI-RS.

In one embodiment, the second candidate time-frequency resource set is assigned to a DMRS.

In one embodiment, the first candidate time-frequency resource set corresponds to one CRI.

Embodiment 8

Figure 8:
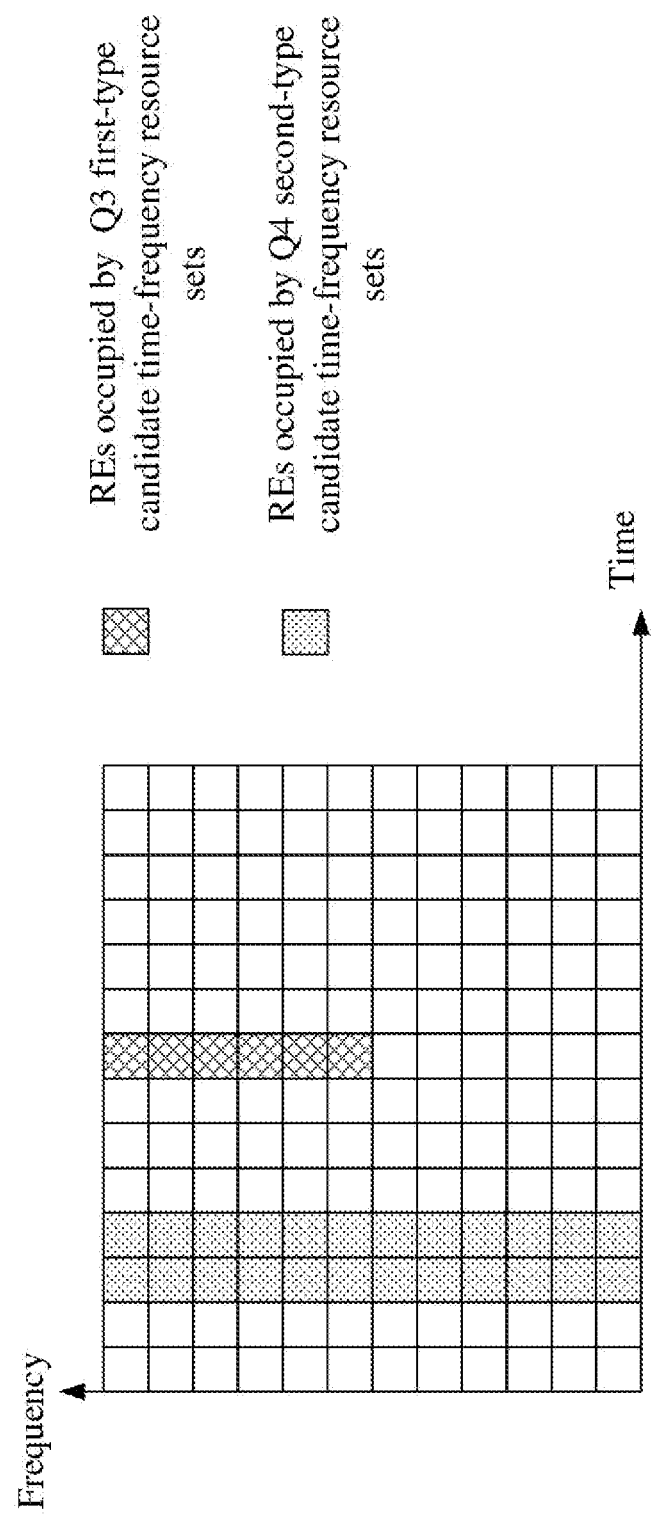
FIG. 8 is a diagram illustrating Q candidate time-frequency resource sets according to one embodiment of the disclosure.

Embodiment 8 illustrates an example of a diagram of Q candidate time-frequency resource sets, as shown in FIG. 8. FIG. 8 illustrates a pattern of REs occupied by Q candidate time-frequency resource sets in one RB. In Embodiment 8, the Q candidate time-frequency resource sets include Q3 first-type candidate time-frequency resource sets and Q4 second-type candidate time-frequency resource sets; any one of the Q3 first-type candidate time-frequency resource sets is assigned for transmission of the first type of RS in the disclosure, and any one of the Q4 second-type candidate time-frequency resource sets is assigned for transmission of the second type of RS in the disclosure; and the Q3 and the Q4 are both positive integers.

In one embodiment, REs occupied by any one of the Q3 first-type candidate time-frequency resource sets are orthogonal to REs occupied by any one of the Q4 second-type candidate time-frequency resource sets.

In one embodiment, any one of the Q candidate time-frequency resource sets is configured through a higher layer signaling.

In one embodiment, any one of the Q candidate time-frequency resource sets is configured through the first signaling in the disclosure.

In one embodiment, any one of the Q candidate time-frequency resource sets is configured through the second signaling.

Embodiment 9

Embodiment 9 illustrates an example of a diagram of a first field, as shown in FIG. 9. In Embodiment 9, the first information, the second information and the first field in the disclosure are all transmitted in one physical layer channel; the physical layer channel is a PUSCH, or the physical layer channel is a PUCCH.

In one embodiment, the first field includes a fixed number of information bits.

In one embodiment, the first information includes a fixed number of information bits.

In one embodiment, a number of information bits included in the first information is related to a number of types of RSs to which the first time-frequency resource set can correspond.

In one embodiment, the second information includes a variable number of information bits.

Embodiment 10

Embodiment 10 illustrates an example of a diagram of second information, as shown in FIG. 10. In Embodiment 10, the second information includes at least a CQI among the CQI, a PMI, an RI, an RSRP, an RSRQ, a PTI and an SINR; whether the channel state information types marked by dash lines in FIG. 10 are included in the second information is related to whether the type corresponding to the first time-frequency resource set is the first type or the second type.

In one embodiment, the type corresponding to the first time-frequency resource set is the first type, the second information includes a CQI, and the second information includes at least one of a PMI, an RI, an RSRP, an RSRQ, a PTI and an SINR.

In one embodiment, the type corresponding to the first time-frequency resource set is the second type, and the second information includes a CQI and does not include a PMI and an RI.

Embodiment 11

Embodiment 11 illustrates an example of a diagram of given channel state information, as shown in FIG. 11. In Embodiment 11, the first radio signal is correctly received and the given type of channel state information includes M1 information bit(s), or the first radio signal is not correctly received and the given type of channel state information includes M2 information bit(s); the M1 is not equal to the M2; the M1 information bit(s) is(are) associated to the third CQI Index set shown in FIG. 11, and the M2 information bit(s) is(are) associated to the fourth CQI Index set shown in FIG. 11; the CQI Index with shadow in FIG. 11 is a target CQI Index, and the target CQI Index corresponds to an MCS and a code rate employed by the first radio signal.

In one embodiment, the given type of channel state information is a CQI.

Embodiment 12

Embodiment 12 illustrates an example of another diagram of given channel state information, as shown in FIG. 12. In Embodiment 12, the first radio signal is correctly received and the given type of channel state information includes M1 information bit(s), or the first radio signal is not correctly received and the given type of channel state information includes M2 information bit(s); the M1 is equal to the M2; the M1 information bit(s) is(are) associated to the fifth CQI Index set shown in FIG. 11, and the M2 information bit(s) is(are) associated to the sixth CQI Index set shown in FIG. 11. A number of CQI Indexes included in the fifth CQI Index set is equal to a number of CQI Indexes included in the sixth CQI Index set; the fifth CQI Index set and the sixth CQI Index set both include the target CQI Index shown in FIG. 12. The CQI Index with shadow in FIG. 12 is a target CQI Index, and the target CQI Index corresponds to an MCS and a code rate employed by the first radio signal.

In one embodiment, the given type of channel state information is a CQI.

Embodiment 13

Figure 13:
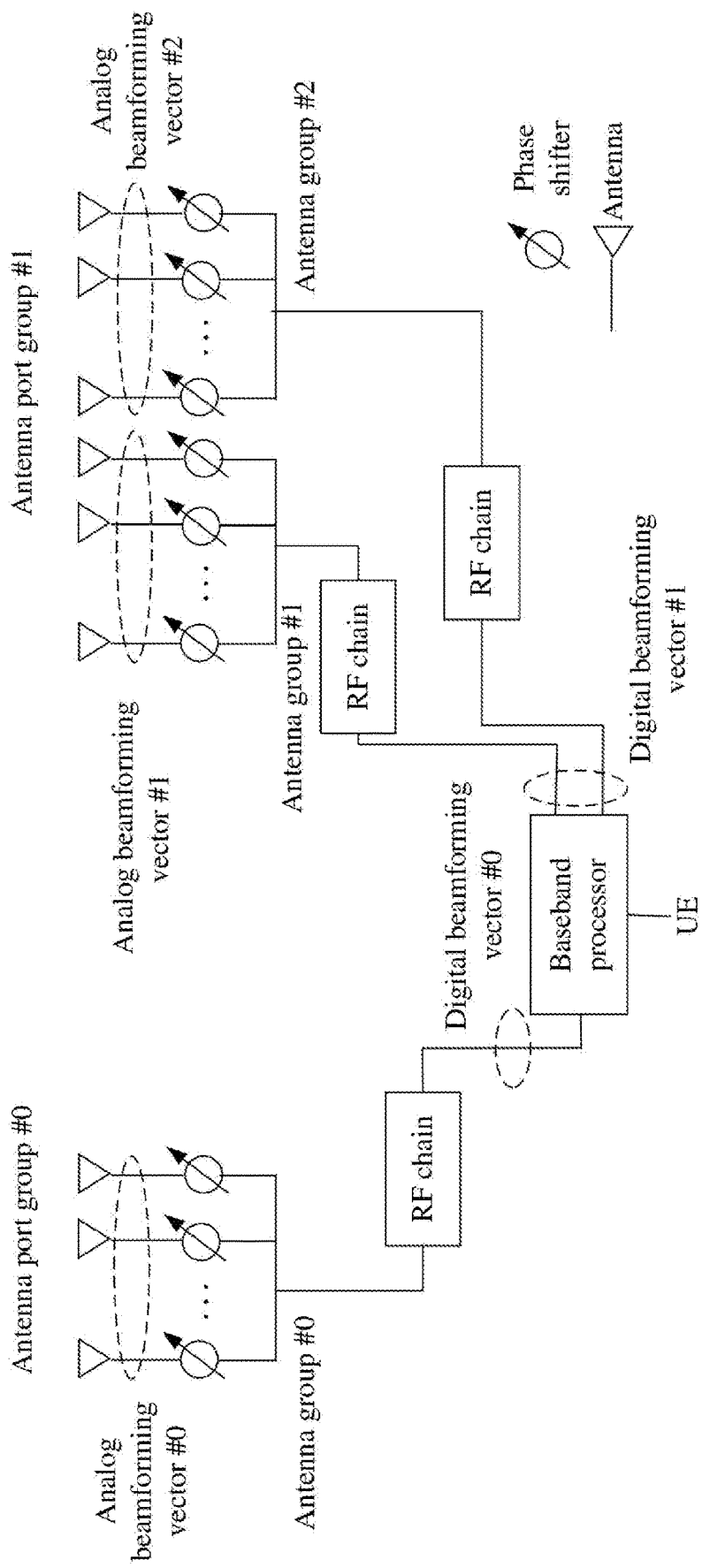
FIG. 13 is diagram illustrating an antenna port and an antenna port group according to one embodiment of the disclosure.

Embodiment 13 illustrates an example of a diagram of an antenna port and an antenna port group, as shown in FIG. 13. In Embodiment 13, one antenna port group includes a positive integer number of antenna ports; one antenna port is formed by antennas in a positive integer number of antenna groups through antenna virtualization superposition; one antenna group includes a positive integer number of antennas. One antenna group is connected to a baseband processor through one Radio Frequency (RF) chain, and different antenna groups correspond to different RF chains. Mapping coefficients from all antennas in a positive integer number of antenna groups included in a given antenna port to the given antenna port constitute a beamforming vector corresponding to the given antenna port. Mapping coefficients from multiple antennas included in any one given antenna group among a positive integer number of antenna groups included in the given antenna port to the given antenna port constitute an analog beamforming vector of the given antenna group. Analog beamforming vectors corresponding to the positive integer number of antenna groups are diagonally arranged to form an analog beamforming matrix corresponding to the given antenna port. Mapping coefficients from the positive integer number of antenna groups to the given antenna port constitute a digital beamforming vector corresponding to the given antenna port. The beamforming vector corresponding to the given antenna port is obtained by a product of the analog beamforming matrix and the digital beamforming vector corresponding to the given antenna port. Different antenna ports in one antenna port group are formed by same antenna group(s), and different antenna ports in one same antenna port group correspond to different beamforming vectors.

FIG. 13 illustrates two antenna port groups, that is, an antenna port group #0 and an antenna port group #1, wherein the antenna port group #0 is formed by an antenna group #0, the antenna port group #1 is formed by an antenna group #1 and an antenna group #2. Mapping coefficients from multiple antennas in the antenna group #0 to the antenna port group #0 constitute an analog beamforming vector #0, a mapping coefficient from the antenna group #0 to the antenna port group #0 constitutes a digital beamforming vector #0. Mapping coefficients from multiple antennas in the antenna group #1 and multiple antennas in the antenna group #2 to the antenna port group #1 constitute an analog beamforming vector #1 and an analog beamforming vector #2 respectively. Mapping coefficients from the antenna group #1 and the antenna group #2 to the antenna port group #1 constitute a digital beamforming vector #1. A beamforming vector corresponding to any one antenna port in the antenna port group #0 is obtained by a product of the analog beamforming vector #0 and the digital beamforming vector #0. A beamforming vector corresponding to any one antenna port in the antenna port group #1 is obtained by a product of an analog beamforming matrix, which is formed by diagonal arrangement of the analog beamforming vector #1 and the analog beamforming vector #2, and the digital beamforming vector #1.

In one embodiment, one antenna port group includes one antenna port. For example, the antenna port group #0 illustrated in FIG. 13 includes one antenna port.

Figure 14:
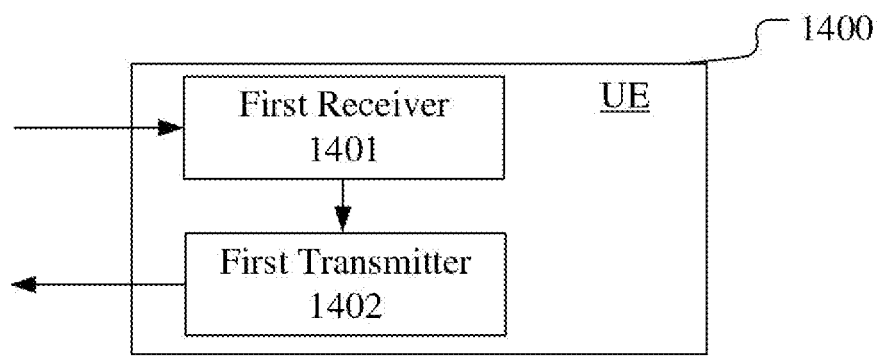
FIG. 14 is a structure block diagram illustrating a processing device in a UE according to one embodiment of the disclosure.

In one subembodiment, an analog beamforming matrix corresponding to the one antenna port is dimensionally reduced to an analog beamforming vector, a digital beamforming vector corresponding to the one antenna port is dimensionally reduced to one scalar, and a beamforming vector corresponding to the one antenna port is equal to the analog beamforming vector of the one antenna port. For example, the digital beamforming vector #0 in FIG. 14 is dimensionally reduced to one scalar, and the beamforming vector corresponding to the antenna port in the antenna port group #0 is the analog beamforming vector #0.

In one embodiment, one antenna port group includes multiple antenna ports.

In one subembodiment, the multiple antenna ports correspond to a same analog beamforming matrix and different digital beamforming vectors.

In one embodiment, antenna ports in different antenna port groups correspond to different analog beamforming matrixes.

In one embodiment, any two antenna ports in one antenna port group are QCLed.

In one subembodiment, the phrase that two antenna ports are QCLed includes: partial or all large-scale properties of a radio signal transmitted by one of the two antenna ports can be deduced from partial or all large-scale properties of a radio signal transmitted by the other of the two antenna ports; the large-scale properties include one or more of delay spread, Doppler spread, Doppler shift, path loss and average gain.

In one embodiment, any two antenna ports in one antenna port group are spatial QCLed.

In one embodiment, one RF chain shown in FIG. 13 is used for performing the first listening on one of the Q subbands in the disclosure.

In one embodiment, one RF chain shown in FIG. 13 is used for performing the first listening on multiple subbands among the Q subbands in the disclosure.

In one embodiment, one RF chain shown in FIG. 13 is used for performing the second listening on multiple subbands among the Q subbands in the disclosure.

In one embodiment, any one of the Q candidate time-frequency resource sets in the disclosure is assigned to one antenna port group in the disclosure.

In one embodiment, any one of the Q candidate time-frequency resource sets in the disclosure is assigned to multiple antenna port groups in the disclosure.

In one embodiment, any one of the Q candidate time-frequency resource sets in the disclosure is assigned to one antenna port in the disclosure.

In one embodiment, any one of the Q candidate time-frequency resource sets in the disclosure is assigned to multiple antenna port in the disclosure.

Embodiment 14

Embodiment 14 illustrates an example of a structure block diagram of a processing device in a UE, as shown in FIG. 14. In FIG. 14, the processing device 1400 in the UE includes a first receiver 1401 and a first transmitter 1402.

The first receiver 1401 receives a first reference signal in a first time-frequency resource set.

The first transmitter 1402 transmits first information and second information.

In Embodiment 14, the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information included in the second information is related to a type corresponding to the first time-frequency resource set, and the type corresponding to the first time-frequency resource set is one of the first type and the second type; and any one type of channel state information included in the second information belongs to a first channel state information type set.

In one embodiment, the first receiver 1401 further receives a first signaling; and the first signaling includes Q pieces of configuration information, and the Q candidate time-frequency resource sets are assigned to Q reference signal resources by the Q pieces of configuration information respectively.

In one embodiment, the UE is characterized in that: if the type corresponding to the first time-frequency resource set is the first type, the second information includes a target type of channel state information; and if the type corresponding to the first time-frequency resource set is the second type, the second information does not include a target type of channel state information In one embodiment, the first receiver 1401 further receives a first radio signal; and the second information includes a first field, and the first field is used for determining whether the first radio signal is correctly received.

In one embodiment, the UE is characterized in that: the second information includes a given type of channel state information; the first radio signal is correctly received and the given type of channel state information includes M1 information bit(s), or the first radio signal is not correctly received and the given type of channel state information includes M2 information bit(s); the M1 and the M2 are both positive integers; the M1 is not equal to the M2, or the M1 information bit(s) and the M2 information bit(s) are associated with different CQI sets respectively.

In one embodiment, the first receiver 1401 further receives a second signaling; and the second signaling is used for triggering transmission of at least the second information among the first information and the second information.

In one subembodiment, the first receiver 1401 includes at least the former four of the antenna 452, the receiver 454, the multi-antenna receiving processor 458, the receiving processor 456 and the controller/processor 459.

In one embodiment, the first transmitter 1402 includes at least the former four of the antenna 452, the transmitter 454, the multi-antenna transmitting processor 457, the transmitting processor 458 and the controller/processor 459.

Embodiment 15

Figure 15:
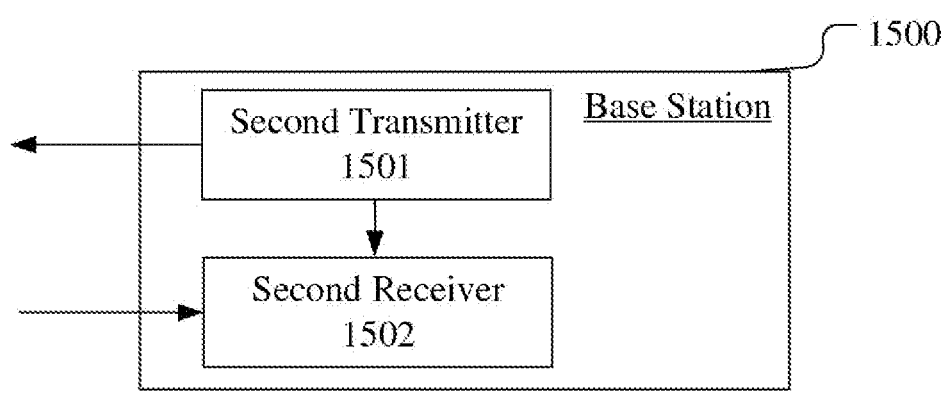
FIG. 15 is a structure block diagram illustrating a processing device in a base station according to one embodiment of the disclosure.

Embodiment 15 illustrates an example of a structure block diagram of a processing device in a base station, as shown in FIG. 15. In FIG. 15, the processing device 1500 in the base station includes a second transmitter 1501 and a second receiver 1502.

The second transmitter 1501 transmits a first reference signal in a first time-frequency resource set.

The second receiver 1502 receives first information and second information.

In Embodiment 15, the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information included in the second information is related to a type corresponding to the first time-frequency resource set, and the type corresponding to the first time-frequency resource set is one of the first type and the second type; and any one type of channel state information included in the second information belongs to a first channel state information type set.

In one embodiment, the second transmitter 1501 further transmits a first signaling; and the first signaling includes Q pieces of configuration information, and the Q candidate time-frequency resource sets are assigned to Q reference signal resources by the Q pieces of configuration information respectively.

In one embodiment, the base station is characterized in that: if the type corresponding to the first time-frequency resource set is the first type, the second information includes a target type of channel state information; and if the type corresponding to the first time-frequency resource set is the second type, the second information does not include a target type of channel state information.

In one embodiment, the second transmitter 1501 further transmits a first radio signal; and the second information includes a first field, and the first field is used for determining whether the first radio signal is correctly received.

In one embodiment, the base station is characterized in that: the second information includes a given type of channel state information; the first radio signal is correctly received by a transmitter of the first information and the given type of channel state information includes M1 information bit(s), or the first radio signal is not correctly received by a transmitter of the first information and the given type of channel state information includes M2 information bit(s); the M1 and the M2 are both positive integers; the M1 is not equal to the M2, or the M1 information bit(s) and the M2 information bit(s) are associated with different CQI sets respectively.

In one embodiment, the second transmitter 1501 further transmits a second signaling; and the second signaling is used for triggering transmission of at least the second information among the first information and the second information.

In one embodiment, the second receiver 1502 includes at least the former four of the antenna 420, the receiver 418, the multi-antenna receiving processor 472, the receiving processor 470 and the controller/processor 475.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station or system in the disclosure includes but not limited to macro-cellular base stations, micro-cellular base stations, home base stations, relay base station, gNB (NR node B), TRP, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
   receiving a first reference signal in a first time-frequency resource set; and
   transmitting first information and second information;
   wherein the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information comprised in the second information is related to a type corresponding to the first time-frequency resource set, and the type corresponding to the first time-frequency resource set is one of the first type and the second type; and any one type of channel state information comprised in the second information belongs to a first channel state information type set.

2. The method according to claim 1, comprising:
   receiving a first signaling;
   wherein the first signaling comprises Q pieces of configuration information, and the Q candidate time-frequency resource sets are assigned to Q reference signal resources by the Q pieces of configuration information respectively;
   or, the method comprising:
   receiving a second signaling;
   wherein the second signaling is used for triggering transmission of at least the second information among the first information and the second information.

3. The method according to claim 1, wherein if the type corresponding to the first time-frequency resource set is the first type, the second information comprises a target type of channel state information; and if the type corresponding to the first time-frequency resource set is the second type, the second information does not comprise a target type of channel state information.

4. The method according to claim 1, comprising:
   receiving a first radio signal;
   wherein the second information comprises a first field, and the first field is used for determining whether the first radio signal is correctly received.

5. The method according to claim 4, wherein the second information comprises a given type of channel state information; the first radio signal is correctly received and the given type of channel state information comprises M1 information bit(s), or the first radio signal is not correctly received and the given type of channel state information comprises M2 information bit(s); the M1 and the M2 are both positive integers; the M1 is not equal to the M2, or the M1 information bit(s) and the M2 information bit(s) are associated with different Channel Quality Indicator (CQI) sets respectively.

6. A method in a base station for wireless communication, comprising:
   transmitting a first reference signal in a first time-frequency resource set; and
   receiving first information and second information;
   wherein the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information comprised in the second information is related to a type corresponding to the first time-frequency resource set, and the type corresponding to the first time-frequency resource set is one of the first type and the second type; and any one type of channel state information comprised in the second information belongs to a first channel state information type set.

7. The method according to claim 6, comprising:
   transmitting a first signaling;
   wherein the first signaling comprises Q pieces of configuration information, and the Q candidate time-frequency resource sets are assigned to Q reference signal resources by the Q pieces of configuration information respectively;

or, the method comprising:

transmitting a second signaling;

wherein the second signaling is used for triggering transmission of at least the second information among the first information and the second information.

8. The method according to claim 7, wherein if the type corresponding to the first time-frequency resource set is the first type, the second information comprises a target type of channel state information; and if the type corresponding to the first time-frequency resource set is the second type, the second information does not comprise a target type of channel state information.

9. The method according to claim 7, comprising:

transmitting a first radio signal;

wherein the second information comprises a first field, and the first field is used for determining whether the first radio signal is correctly received.

10. The method according to claim 9, wherein the second information comprises a given type of channel state information; the first radio signal is correctly received by a transmitter of the first information and the given type of channel state information comprises M1 information bit(s), or the first radio signal is not correctly received by a transmitter of the first information and the given type of channel state information comprises M2 information bit(s); the M1 and the M2 are both positive integers; the M1 is not equal to the M2, or the M1 information bit(s) and the M2 information bit(s) are associated with different CQI sets respectively.

11. A UE for wireless communication, comprising:

a first receiver, to receive a first reference signal in a first time-frequency resource set; and a first transmitter, to transmit first information and second information;

wherein the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information comprised in the second information is related to a type corresponding to the first time-frequency resource set, and the type corresponding to the first time-frequency resource set is one of the first type and the second type; and any one type of channel state information comprised in the second information belongs to a first channel state information type set.

12. The UE according to claim 11, wherein the first receiver receives a first signaling; and the first signaling comprises Q pieces of configuration information, and the Q candidate time-frequency resource sets are assigned to Q reference signal resources by the Q pieces of configuration information respectively;

or, the first receiver receives a second signaling; and the second signaling is used for triggering transmission of at least the second information among the first information and the second information.

13. The UE according to claim 11, wherein if the type corresponding to the first time-frequency resource set is the first type, the second information comprises a target type of channel state information; and if the type corresponding to the first time-frequency resource set is the second type, the second information does not comprise a target type of channel state information.

14. The UE according to claim 11, wherein the first receiver receives a first radio signal; and the second information comprises a first field, and the first field is used for determining whether the first radio signal is correctly received.

15. The UE according to claim 14, wherein the second information comprises a given type of channel state information; the first radio signal is correctly received and the given type of channel state information comprises M1 information bit(s), or the first radio signal is not correctly received and the given type of channel state information comprises M2 information bit(s); the M1 and the M2 are both positive integers; the M1 is not equal to the M2, or the M1 information bit(s) and the M2 information bit(s) are associated with different CQI sets respectively.

16. A base station for wireless communication, comprising:

a second transmitter, to transmit a first reference signal in a first time-frequency resource set; and a second receiver, to receive first information and second information;

wherein the first information indicates the first time-frequency resource set from Q candidate time-frequency resource sets, the Q being a positive integer greater than 1; at least two of the Q candidate time-frequency resource sets correspond to a first type and a second type respectively; a channel measurement for the first reference signal is used for determining the second information; a type of channel state information comprised in the second information is related to a type corresponding to the first time-frequency resource set, and the type corresponding to the first time-frequency resource set is one of the first type and the second type; and any one type of channel state information comprised in the second information belongs to a first channel state information type set.

17. The base station according to claim 16, wherein the second transmitter transmits a first signaling; and the first signaling comprises Q pieces of configuration information, and the Q candidate time-frequency resource sets are assigned to Q reference signal resources by the Q pieces of configuration information respectively;

or, the second transmitter transmits a second signaling; and the second signaling is used for triggering transmission of at least the second information among the first information and the second information.

18. The base station according to claim 17, wherein if the type corresponding to the first time-frequency resource set is the first type, the second information comprises a target type of channel state information; and if the type corresponding to the first time-frequency resource set is the second type, the second information does not comprise a target type of channel state information.

19. The base station according to claim 17, wherein the second transmitter transmits a first radio signal; and the second information comprises a first field, and the first field is used for determining whether the first radio signal is correctly received.

20. The base station according to claim 19, wherein the second information comprises a given type of channel state information; the first radio signal is correctly received by a transmitter of the first information and the given type of channel state information comprises M1 information bit(s), or the first radio signal is not correctly received by a transmitter of the first information and the given type of channel state information comprises M2 information bit(s); the M1 and the M2 are both positive integers; the M1 is not equal to the M2, or the M1 information bit(s) and the M2 information bit(s) are associated with different CQI sets respectively.

\* \* \* \* \*